US010694105B1

(12) United States Patent
Yadav et al.

(10) Patent No.: US 10,694,105 B1
(45) Date of Patent: Jun. 23, 2020

(54) METHOD AND SYSTEM FOR HANDLING OCCLUDED REGIONS IN IMAGE FRAME TO GENERATE A SURROUND VIEW

(71) Applicant: Wipro Limited, Bangalore (IN)

(72) Inventors: Tarun Yadav, Bangalore (IN); Vinod Pathangay, Bangalore (IN); Gyanesh Dwivedi, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/275,549

(22) Filed: Feb. 14, 2019

(30) Foreign Application Priority Data

Dec. 24, 2018 (IN) .............................. 201841048875

(51) Int. Cl.
*H04N 5/232* (2006.01)
*G06T 3/40* (2006.01)
(Continued)

(52) U.S. Cl.
CPC ....... *H04N 5/23238* (2013.01); *G06T 3/4038* (2013.01); *G06T 7/248* (2017.01); *B60R 1/00* (2013.01); *B60R 2300/105* (2013.01); *B60R 2300/303* (2013.01); *G06T 2207/20021* (2013.01)

(58) Field of Classification Search
CPC ........... G06T 2207/30252; G06T 5/005; G06T 7/248; G06T 3/4038; H04N 5/23238
See application file for complete search history.

(56) References Cited

U.S. PATENT DOCUMENTS 8,797,417 B2 * 8/2014 Gayko .................... G06T 5/005
                                                      348/154
8,823,796 B2   9/2014 Shen et al.
(Continued)

FOREIGN PATENT DOCUMENTS

CN      103042972 A       4/2013
EP         1790541 A2 *   5/2007    ............... B60R 1/00
(Continued)

OTHER PUBLICATIONS

Ballester, "A TV-L1 Optical Flow Method With Occlusion Detection", 2012, pp. 31-40, Springer-Verlag Berlin Heidelberg.

*Primary Examiner* — David E Harvey
(74) *Attorney, Agent, or Firm* — Finnegan, Henderson, Farabow, Garrett & Dunner, LLP (57) ABSTRACT

The present disclosure is related in general to field of machine learning and image processing and a method and system for handling occluded regions in an image frame to generate surround view. A surround view generating device detects presence or absence of occluded blocks in each image frame received from image capturing devices associated with the vehicle, based on speed and direction of the vehicle. Further, occluded blocks are predicted by mapping the image frames and sensor data of the vehicle with pre-stored image data using a machine learning model. Finally, corrected image frames are generated by stitching the predicted occluded blocks to the image frames, and then a surround view of the vehicle is generated using corrected image frames and the plurality of image frames. The present disclosure enables prediction of occlusions caused due to dust or water depositions on the image capturing devices of non-overlapping field of view.

15 Claims, 7 Drawing Sheets

(51) Int. Cl.
*G06T 7/246* (2017.01)
*B60R 1/00* (2006.01)

(56) References Cited

U.S. PATENT DOCUMENTS

| | | | |
|---|---|---|---|
| 9,902,322 B2 | 2/2018 | Kuehnle et al. | |
| 10,282,827 B2* | 5/2019 | Ulaganathan | G06T 5/005 |
| 10,326,917 B2* | 6/2019 | Gurovski | H04N 7/18 |
| 2011/0216201 A1* | 9/2011 | McAndrew | G06T 7/80 |
| | | | 348/148 |
| 2011/0273582 A1* | 11/2011 | Gayko | G06T 5/005 |
| | | | 348/222.1 |
| 2013/0156297 A1* | 6/2013 | Shotton | G06K 9/6255 |
| | | | 382/159 |
| 2014/0049646 A1 | 2/2014 | Nix | |
| 2015/0202257 A1* | 7/2015 | Rincon | A61K 38/1709 |
| | | | 424/139.1 |
| 2015/0310273 A1* | 10/2015 | Shreve | G06K 9/00624 |
| | | | 382/103 |
| 2016/0004144 A1* | 1/2016 | Laroia | G03B 17/18 |
| | | | 348/222.1 |
| 2016/0191795 A1 | 6/2016 | Han et al. | |
| 2017/0113614 A1 | 4/2017 | Fluegel | |
| 2017/0132476 A1* | 5/2017 | Chien | G06K 9/00791 |
| 2017/0132764 A1* | 5/2017 | Chan | G06T 5/005 |
| 2017/0277961 A1 | 9/2017 | Kuehnle | |
| 2019/0057527 A1* | 2/2019 | Jin | G06T 5/50 |
| 2019/0079535 A1* | 3/2019 | Zhu | G05D 1/0253 |
| 2019/0109988 A1* | 4/2019 | Lin | H04N 5/23206 |
| 2019/0122373 A1* | 4/2019 | Natroshvili | G06N 3/0481 |
| 2020/0034953 A1* | 1/2020 | Friebe | G06T 5/005 |

FOREIGN PATENT DOCUMENTS

| | | | | |
|---|---|---|---|---|
| EP | 1868375 A1 | * | 12/2007 | B60R 1/00 |
| GB | 2559760 A | * | 8/2018 | G06T 3/4038 |
| WO | WO-2010038223 A1 | * | 4/2010 | H04N 5/2171 |
| WO | WO-2017043331 A1 | * | 3/2017 | G06T 5/005 |

* cited by examiner

METHOD AND SYSTEM FOR HANDLING OCCLUDED REGIONS IN IMAGE FRAME TO GENERATE A SURROUND VIEW

This application claims the benefit of Indian Patent Application Serial No. 201841048875, filed Dec. 24, 2018, which is hereby incorporated by reference in its entirety.

FIELD

The present subject matter is related in general to the field of machine learning and image processing, and more particularly, but not exclusively to a method and a system for handling occluded regions in an image frame to generate a surround view.

BACKGROUND

Nowadays, vehicles are equipped with Advanced Driver Assisted Systems (ADAS) to provide assistance while driving a vehicle. One of the popular and highly useful ADAS in the recent times is surround view generation feature. The surround view provides a top-view or a bird's eye view of the vehicle along with coverage of 360-degree surrounding area of the vehicle. The surround view provides a view of the exterior of the vehicle on a display associated with the vehicle, to assist driver of the vehicle in manoeuvring the vehicle and also alerts the driver regarding obstacles along its path that may not be immediately visible. This feature helps in avoiding collisions with nearby vehicles on the road and also with other vehicles while parking in tight spaces.

One of the main requirements to generate an accurate surround view is to capture clear images of the surroundings of the vehicle in real-time. However, image capturing devices that capture the images are generally configured on external surface of the vehicle, due to which the image capturing devices may be exposed to environmental factors such as smoke, dirt, water and the like. There exists a high probability that, lenses of the image capturing devices could be covered partially or completely by dirt, water, and the like which affects clarity of images and creates certain occluded regions in the images. Due to such occluded regions in the images, surround view may not be generated accurately, which would subsequently affect the assistance provided to the driver.

Existing techniques provide techniques where images obtained by multiple image capturing devices of overlapping field of view may be used to remove occluded regions in the images caused by external objects such as other vehicles, mirrors of the vehicles, and the like. However, the images obtained from the multiple image capturing devices of overlapping field of view would be redundant and would involve processing of multiple images, thereby increasing the Turn Around time (TAT) for removing the occluded regions and also would lead to high utilization of resources. Further, if lenses of the multiple image capturing devices with overlapping field of view are covered with dust or water, the existing techniques may not be able to detect the occluded regions.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Disclosed herein is a method of handling occluded regions in an image frame to generate a surround view. The method includes receiving, by a surround view generating device, a plurality of image frames captured from each of a plurality of image capturing devices associated with a vehicle, and sensor data from a plurality of sensors associated with the vehicle. The plurality of image capturing devices comprises a non-overlapping field of view. Further, the method includes detecting at least one of presence or absence of one or more occluded blocks in each of the plurality of image frames based on speed of the vehicle and direction of the vehicle received as part of the sensor data. Subsequently, the method includes predicting the one or more occluded blocks by mapping the plurality of image frames and the sensor data with pre-stored image data using a machine learning model. Upon predicting the one or more occluded blocks, the method includes generating one or more corrected image frames by stitching the predicted one or more occluded blocks to the plurality of image frames comprising the one or more occluded blocks. Finally, the method comprises generating a surround view of the vehicle using at least one of the one or more corrected image frames and the plurality of image frames.

Further, the present disclosure comprises a surround view generating device for handling occluded regions in an image frame to generate a surround view. The surround view generating device comprises a processor and a memory communicatively coupled to the processor. The memory stores the processor-executable instructions, which, on execution, causes the processor to receive a plurality of image frames captured from each of a plurality of image capturing devices associated with a vehicle, and sensor data from a plurality of sensors associated with the vehicle. The plurality of image capturing devices comprises a non-overlapping field of view. Further, the processor detects at least one of presence or absence of one or more occluded blocks in each of the plurality of image frames based on speed of the vehicle and direction of the vehicle received as part of the sensor data. Subsequently, the processor predicts the one or more occluded blocks by mapping the plurality of image frames and the sensor data with pre-stored image data using a machine learning model. Upon predicting the one or more occluded blocks, the processor generates one or more corrected image frames by stitching the predicted one or more occluded blocks to the plurality of image frames comprising the one or more occluded blocks. Finally, the processor generates a surround view of the vehicle using at least one of the one or more corrected image frames and the plurality of image frames.

Furthermore, the present disclosure comprises a non-transitory computer readable medium including instructions stored thereon that when processed by a surround view generating device, causes the surround view generating device to perform operations comprising receiving a plurality of image frames captured from each of a plurality of image capturing devices associated with a vehicle, and sensor data from a plurality of sensors associated with the vehicle. The plurality of image capturing devices comprises a non-overlapping field of view. Further, the instructions cause the processor to detect at least one of presence or absence of one or more occluded blocks in each of the plurality of image frames based on speed of the vehicle and direction of the vehicle received as part of the sensor data. Subsequently, the instructions cause the processor to predict the one or more occluded blocks by mapping the plurality of image frames and the sensor data with pre-stored image data using a machine learning model. Further, the instructions cause the processor to generate one or more corrected image frames by stitching the predicted one or more occluded blocks to the plurality of image frames comprising the one or more occluded blocks. Finally, the instructions cause the processor to generate a surround view of the vehicle using at least one of the one or more corrected image frames and the plurality of image frames.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagram herein represent conceptual views of illustrative systems embodying the principles of the present subject matter. Similarly, it will be appreciated that any flow chart, flow diagram, state transition diagram, pseudo code, and the like represent various processes which may be substantially represented in computer readable medium and executed by a computer or a processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure provides a method and a device for handling occluded regions in an image frame to generate a surround view. A surround view generating device associated with a vehicle may provide surround view i.e. a top-view or a bird's eye view of the vehicle along with coverage of 360-degree surrounding area of the vehicle which assists driver of the vehicle in manoeuvring the vehicle. The surround view generating device may receive a plurality of image frames from each of plurality of image capturing devices associated with the vehicle. In some embodiments, each of the plurality of image capturing devices is positioned in such a way that they have a non-overlapping field of view. Further, the surround view generating device may also receive sensor data from a plurality of sensors associated with the vehicle. In some embodiments, the plurality of sensors may include, but not limited to, Light Detection and Ranging (LIDAR), Global Positioning System (GPS), and proximity sensors. The surround view generating device may further detect if the plurality of image frames may include one or more occluded blocks based on the sensor data, by determining an average optical flow vector for each block in each of the plurality of image frames. If the one or more occluded blocks are detected, the surround view generating device may map the plurality of image frames and the sensor data with pre-stored image data to predict the one or more occluded blocks. In some embodiments, the pre-stored image data may include, but not limited to, images captured by one or more other vehicles that had navigated along the same path as the vehicle or images captured by one or more stationary image capturing devices associated with civic infrastructure.

Further, the surround view generating device may generate one or more corrected image frames by stitching the predicted one or more occluded blocks to the plurality of image frames in which the one or more occluded blocks were detected. The one or more corrected image frames thus generated may be used along with the plurality of image frames to generate a surround view of the vehicle.

The present disclosure enables the prediction of the occlusions caused due to dust or water depositions on the plurality of image capturing devices associated with the vehicle by using the pre-stored images that were obtained from at least one of, image capturing devices of the vehicle during previous navigation along the same path or images obtained from image capturing devices of other vehicles passing through the same path or images obtained from image capturing devices associated with civic infrastructure. Further, the present disclosure provides surround view of the vehicle using the plurality of image frames obtained from the plurality of images having non-overlapping field of view. Instead as mentioned above, the present disclosure may make shared use of the images and sensor data captured by various vehicles, to detect and predict the occluded regions, thereby utilizing minimum number of resources for each vehicle. Further, since the image frames are obtained from non-overlapping field of views, the present disclosure does not deal with processing of redundant images while generating the surround view, thereby reducing the Turn Around Time (TAT) involved in generating the surround view. Further, the surround view generation also considers point cloud data received from the LIDAR, which helps in accurately depicting the surroundings of the vehicle in the surround view.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1A:
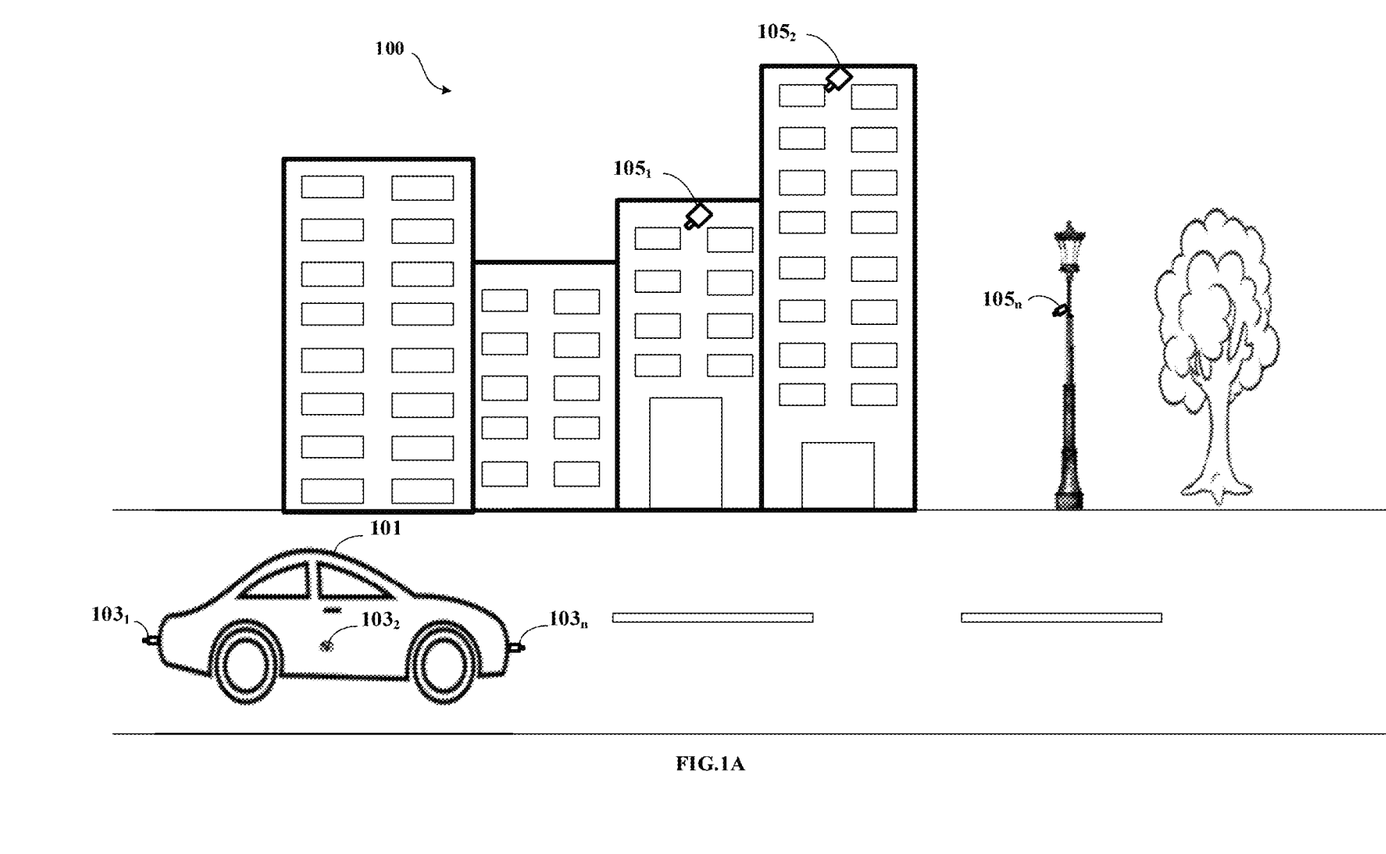
FIG. 1A shows an exemplary architecture for handling occluded regions in an image frame to generate a surround view in accordance with some embodiments of the present disclosure.

FIG. 1A shows an exemplary architecture for handling occluded regions in an image frame to generate a surround view in accordance with some embodiments of the present disclosure.

Figure 1B:
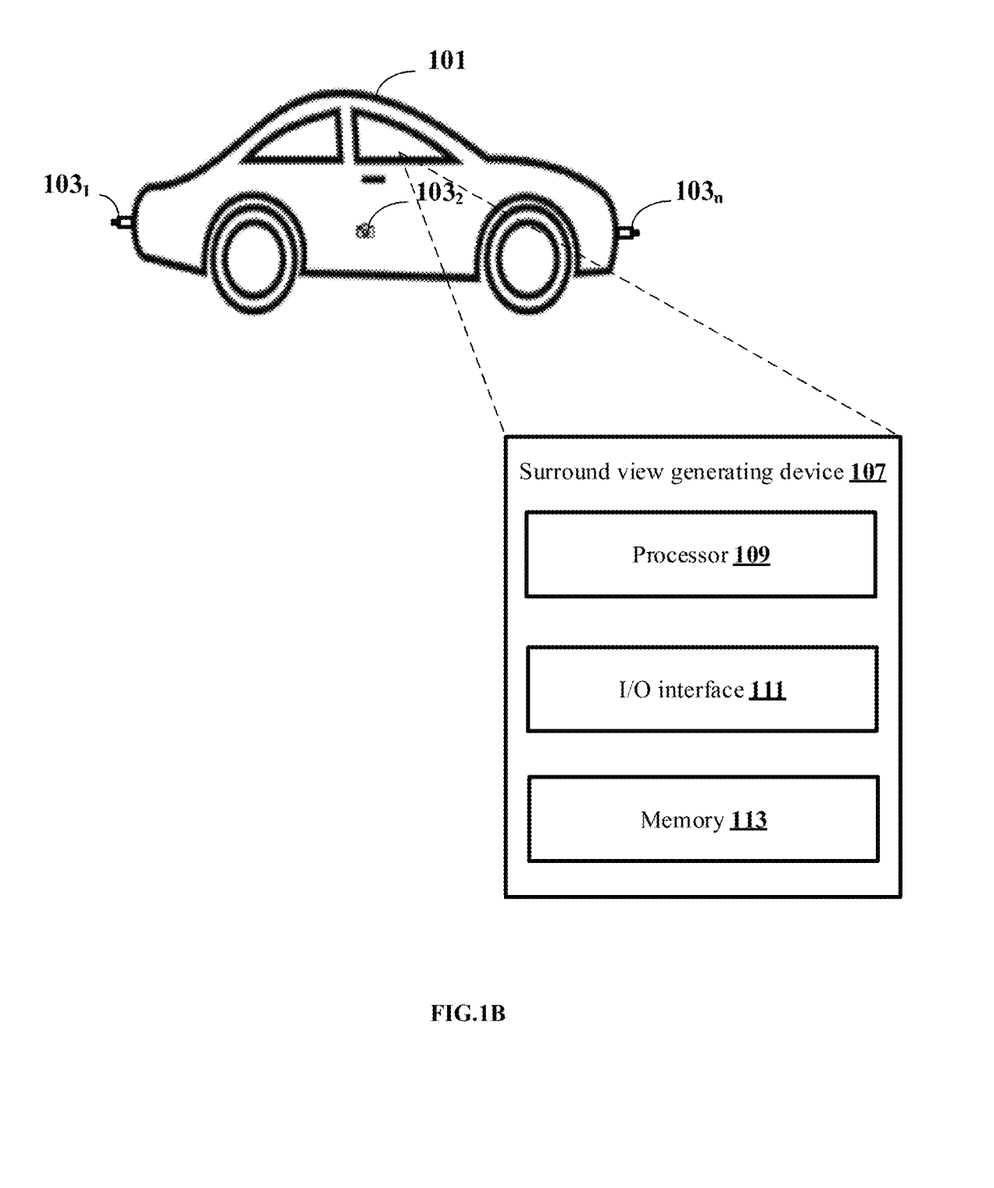
FIG. 1B shows a brief block diagram of the surround view generating device in accordance with some embodiments of the present disclosure.

The architecture 100 comprises a vehicle 101, image capturing devices $103_1$ to $103_n$ (also referred as plurality of image capturing devices 103), stationary image capturing devices $105_1$ to $105_n$ (also referred as one or more stationary image capturing devices 105) and a surround view generating device 107 (shown in FIG. 1B). As an example, the vehicle 101 may be a car, a truck, a bus, and the like. In some embodiments, the plurality of image capturing devices 103 may be associated with the vehicle 101. As an example, the plurality of image capturing devices 103 may include, but not limited to, a camera. The plurality of image capturing devices 103 may be configured on external surface of the vehicle 101 to capture plurality of image frames. Each side of the vehicle 101 may be configured with at least one of the plurality of image capturing devices 103 based on factors such as Field of View (FOV) of the image capturing device 103, dimensions of the vehicle 101 and the like. In some embodiments, each of the plurality of image capturing devices 103 may be configured in a manner that the FOV of each of the plurality of image capturing devices 103 is non-overlapping. In one embodiment the image capturing devices 103 may be placed on top of the vehicle 101. Further, each of the plurality of image capturing devices 103 may be associated with the surround view generating device 107 via a communication network. In some embodiments, the communication network may be at least one of a wired communication network and a wireless communication network.

As shown in FIG. 1B, the surround view generating device 107 may include a processor 109, an Input/Output (I/O) interface 111 and a memory 113. The I/O interface 111 may receive the plurality of image frames captured from each of the plurality of image capturing devices 103. In some embodiments, the plurality of image frames may capture a scene in the FOV of the respective image capturing devices 103. In some embodiments, the plurality of image frames is time synchronized. Further, the I/O interface 111 may receive sensor data from a plurality of sensors (not shown in the FIG. 1) associated with the surround view generating device 107. As an example, the plurality of sensors may include, but not limited to, Light Detection and Ranging (LIDAR), Global Positioning System (GPS), and proximity sensors. In some embodiments, the sensor data may include, but not limited to, point cloud data, proximity data, lidar data, location data, the speed of the vehicle 101 and the direction of the vehicle 101.

Further, the processor 109 may detect presence or absence of one or more occluded blocks in each of the plurality of image frames based on speed of the vehicle and direction of the vehicle received as part of the sensor data. In some embodiments, occlusions may be due to environmental factors such as dust, smoke, water, and the like that may get deposited on lenses of the plurality of image capturing devices 103 and may create hindrance in the FOV of the plurality of image capturing devices 103. In some embodiments, occlusions may also occur due to presence of objects blocking view of the plurality of image capturing devices 103 such as mirrors or other objects protruding from the vehicle 101 and other vehicles in the surroundings of the vehicle 101. When the presence of the one or more occluded blocks is detected, the processor 109 may predict the one or more occluded blocks by mapping the plurality of image frames and the sensor data with pre-stored image data using a machine learning model. In some embodiments, the pre-stored image data may include, but not limited to, images captured by one or more other vehicles that had navigated along the same path as the vehicle 101 and images captured by the one or more stationary image capturing devices 105 associated with civic infrastructure. As an example, the one or more stationary image capturing devices 105 may be security cameras situated in surrounding buildings, cameras situated near traffic signals, and the like.

In some embodiments, predicting the occluded blocks may include identifying contents of the one or more occluded blocks. Further, the processor 109 may generate one or more corrected image frames by stitching the predicted one or more occluded blocks to the plurality of image frames comprising the one or more occluded blocks. The one or more corrected image frames may further be used along with the plurality of image frames to generate a surround view of the vehicle 101. In some embodiments, the processor 109 may use, but not limited to, a homography mapping technique to generate the surround view.

In some embodiments, when the processor 109 detects that the one or more occluded blocks are absent, the plurality of image frames may be directly used for generating the surround view of the vehicle 101. Also, the plurality of image frames which do not include any occluded blocks may be used for training the machine learning models for future predictions.

Figure 2A:
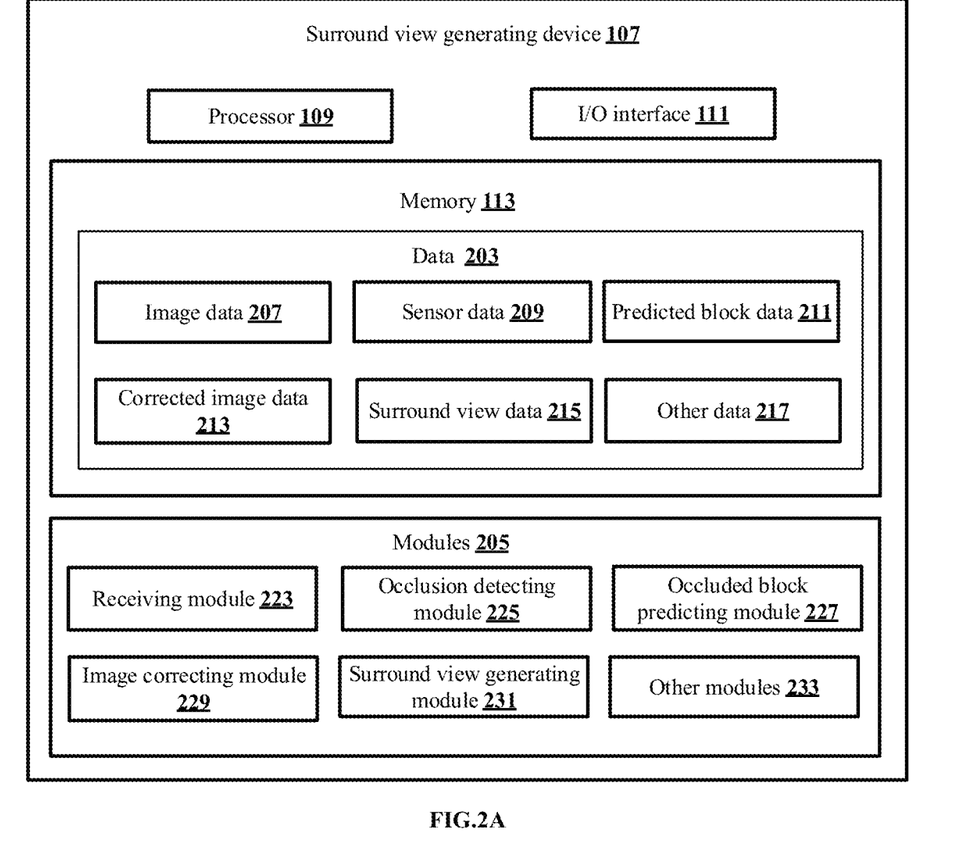
FIG. 2A shows a detailed block diagram of a surround view generating device for handling occluded regions in an image frame to generate a surround view in accordance with some embodiments of the present disclosure.

FIG. 2A shows a detailed block diagram of a surround view generating device for handling occluded regions in an image frame to generate a surround view in accordance with some embodiments of the present disclosure.

In some implementations, the surround view generating device 107 may include data 203 and modules 205. As an example, the data 203 may be stored in a memory 113 configured in the surround view generating device 107 as shown in the FIG. 2A. In one embodiment, the data 203 may include image data 207, sensor data 209, predicted block data 211, corrected image data 213, surround view data 215 and other data 217. In the illustrated FIG. 2A, modules 205 are described herein in detail.

In some embodiments, the data 203 may be stored in the memory 113 in form of various data structures. Additionally, the data 203 can be organized using data models, such as relational or hierarchical data models. The other data 217 may store data, including temporary data and temporary files, generated by the modules 205 for performing the various functions of the surround view generating device 107.

In some embodiments, the data 203 stored in the memory 113 may be processed by the modules 205 of the surround view generating device 107. The modules 205 may be stored within the memory 113. In an example, the modules 205 communicatively coupled to the processor 109 configured in the surround view generating device 107, may also be present outside the memory 113 as shown in FIG. 2A and implemented as hardware. As used herein, the term modules 205 may refer to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a receiving module 223, an occlusion detecting module 225, an occluded block predicting module 227, an image correcting module 229, a surround view generating module 231 and other modules 233. The other modules 233 may be used to perform various miscellaneous functionalities of the surround view generating device 107. It will be appreciated that such aforementioned modules 205 may be represented as a single module or a combination of different modules.

In some embodiments, the receiving module 223 may receive a plurality of image frames captured from each of a plurality of image capturing devices 103 associated with a vehicle 101. As an example, the plurality of image capturing devices 103 may include, but not limited to, cameras. In some embodiments, each of the plurality of image capturing devices 103 may capture the plurality of image frames at a predefined rate. As an example, each of the plurality of image capturing devices 103 may capture 5 to 30 frames per second. The plurality of image frames thus received, may be stored as the image data 207. In some embodiments, each of the plurality of image frames is time synchronized i.e. the processor 109 may assign a timestamp to each of the plurality of image frames using an internal system clock, to ensure that the plurality of image frames correspond to approximately the same time instant. In some embodiments, the plurality of image capturing devices 103 capturing the plurality of image frames may be configured on an external surface of the vehicle 101. Each side of the vehicle 101 may be configured with at least one of the plurality of image capturing devices 103 based on factors such as Field of View (FOV) of the image capturing device 103, dimensions of the vehicle 101 and the like. In some embodiments, each of the plurality of image capturing devices 103 may be configured in a manner that the FOV of each of the plurality of image capturing devices 103 is non-overlapping. Further, the receiving module 223 may receive sensor data 209 from a plurality of sensors associated with the vehicle 101. Sensors (not shown in the FIG. 1) are associated with the surround view generating device 107. As an example, the plurality of sensors may include, but not limited to, Light Detection and Ranging (LIDAR), Global Positioning System (GPS), and proximity sensors. In some embodiments, the sensor data 209 may include, but not limited to, point cloud data, proximity data, lidar data, location data, the speed of the vehicle 101 and the direction of the vehicle 101.

In some embodiments, the occlusion detecting module 225 may detect at least one of presence or absence of one or more occluded blocks in each of the plurality of image frames. In some embodiments, occlusion may occur in the plurality of image frames due to environmental factors such as dust, smoke, water, and the like which may get deposited on lenses of the plurality of image capturing devices 103, thus causing hindrance in the FOV of the plurality of image capturing devices 103. In some embodiments, occlusions may also occur due to presence of objects blocking view of the plurality of image capturing devices 103 such as mirrors or other objects protruding from the vehicle 101 and other vehicles in the surroundings of the vehicle 101.

The occlusion detecting module 225 may detect the presence or the absence of the occluded blocks based on the speed of the vehicle 101 and the direction of the vehicle 101 received as part of the sensor data 209. Initially, the occlusion detecting module 225 may divide each of the plurality of image frames into one or more blocks. Further, the occlusion detecting module 225 may determine an average optical flow vector of each block in each of the plurality of image frames. In some embodiments, the average optical flow vector is a two dimensional vector in image pixel co-ordinates, that joins a point in a previous image frame to its location in a current image frame. In some embodiments, the occlusion detecting module 225 may detect optical flow density for each pixel in each block of the plurality of image frames. Further, the occlusion detecting module 225 may compare the average optical flow vector of each block with a predefined optical flow threshold. In some embodiments, the occlusion detecting module 225 may select the predefined optical flow threshold based on the speed of the vehicle 101 and the direction of the vehicle 101. In some embodiments, the predefined optical flow threshold may be inversely proportional to the speed of the vehicle 101. The predefined optical flow threshold may be selected from a lookup table which is pre-calculated for different speeds and directions of the vehicle 101. In some embodiments, the lookup table may vary for different vehicles based on factors such as, but not limited to, manner in which the one or more image capturing devices 103 may be mounted and height at which the one or more image capturing devices 103 may be mounted on each vehicle. Generally, the manner of mounting and the height of mounting the one or more image capturing devices 103 may be same for a vehicle of particular model of each brand. As an example, lookup table may be same for all vehicles belonging to model "A" of brand "XYZ" since the manner of mounting and the height of mounting the image capturing devices 103 would be same across the model "A" of brand "XYZ". Further, the occlusion detecting module 225 may detect the presence of the one or more occluded blocks when the average optical flow vector of the one or more blocks is greater than or equal to the predefined optical flow threshold. On the other hand, when the average optical flow vector of the one or more blocks is lower than the predefined optical flow threshold, the occlusion detecting module 225 may detect the absence of the one or more occluded blocks. Upon detecting the presence or the absence of the one or more occluded blocks, the occlusion detecting module 225 may tag each of the one or more blocks as at least one of "occluded" or "non-occluded" based on the detection.

In some embodiments, the occluded block predicting module 227 may predict the one or more occluded blocks by mapping the plurality of image frames and the sensor data with pre-stored image data using a machine learning model. As an example, the machine learning model may be a Location-specific Global Prediction Model (LGPM) to predict the one or more occluded blocks. However, this should not be construed as a limitation and any other machine learning model may be used for predicting the one or more occluded blocks. In some embodiments, the machine learning model may be stored on a shared repository associated with the surround view generating device 107, which is globally accessible by all the vehicles. The machine learning model may be trained incrementally in real-time by correlating the image data 207 and the sensor data 209 received from the vehicle 101 and one or more other vehicles that had passed along the same path as the vehicle 101, and plurality of images received from one or more stationary image capturing devices 105 associated with civic infrastructure, of a same location from different vehicles at different times. In some embodiments, only the plurality of image frames without any occluded blocks may be used for training the machine learning model. Further, in some embodiments, different machine learning models could be used for different locations or a single machine learning model may be used for managing different locations.

Therefore, if the occluded block predicting module 227 predicts absence of the one or more occluded blocks in the plurality of image frames, the plurality of image frames may be transmitted to the shared repository for training the machine learning model incrementally. However, if the occluded block predicting module 227 predicts presence of the one or more occluded blocks in the plurality of image frames, for predicting the one or more occluded blocks, the occluded block predicting module 227 may map the plurality of image frames with one or more occluded blocks and the sensor data 209 with pre-stored image data. In some embodiments, the pre-stored image data may be stored in the shared repository, which may include, but not limited to, the plurality of images received from the one or more other vehicles that had passed along the same path as the vehicle 101, and the plurality of images received from the one or more stationary image capturing devices 105. Mapping may include identifying the location of the vehicle 101, identifying motorable surface on which the vehicle 101 is moving and surroundings of the vehicle 101, extracting plurality of image frames from pre-stored image data that match with the identified location, the motorable surface and the surroundings of the vehicle 101. Due to the large number of training epochs and training samples, the machine learning model may understand non-linear relationship between the image data 207, the sensor data 209 and the pre-stored image data, thereby performing successful mapping. Upon mapping, the occluded block predicting module 227 may predict each of the one or more occluded blocks in the plurality of image frames accurately. The predicted one or more occluded blocks may be stored as the predicted block data 211.

In some embodiments, the lidar data and the point cloud data which are part of the sensor data 209 may enable accurate recreation of scene even in occluded regions of the image. As an example, consider a dog is present in a scene which is being captured by one of the plurality of image capturing devices, for example, camera 1. However, due to deposition of dust on lens of camera 1, portion of the scene where the dog is present is occluded. Upon mapping the plurality of images with the pre-stored image data, the occluded block predicting module 227 may predict the occluded blocks. But the pre-stored image data may not have captured a dog in the scene, since the dog may not be present in the scene at the time when that pre-stored image data was captured. However, the lidar data and the point cloud data provide depth information of the scene, which indicates presence of an object in the scene, irrespective of the occlusion in that region of the scene. Upon analysing the depth information, shape and size of the object may be determined, which correspond to the dog in the scene. Therefore, the lidar data and the point cloud data help in accurately depicting the scene in real-time, in spite of the occlusion.

In some embodiments, the image correcting module 229 may generate one or more corrected image frames by stitching the predicted one or more occluded blocks to the plurality of image frames that were detected with presence of the one or more occluded blocks. Each of the one or more corrected image frames may be stored as the corrected image data 213.

Figure 2B:
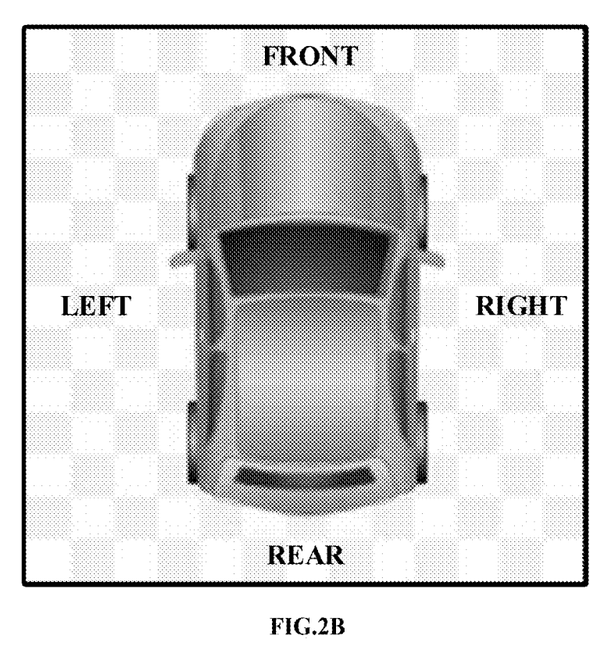
FIG. 2B shows an exemplary surround view of the vehicle in accordance with some embodiments of the present disclosure.

In some embodiments, the surround view generating module 231 may generate a surround view of the vehicle 101 using at least one of the one or more corrected image frames and the plurality of image frames. The surround view generating module 231 may generate the surround view using a homography mapping technique. However, this should not be construed as a limitation as any other technique could be used to generate the surround view. Consider a scenario where the vehicle 101 is configured with 4 image capturing devices i.e. 4 cameras in the front, right, rear and left sides of the vehicle 101. In such scenario, the homography mapping technique may include generating 4 homography matrices by using calibration objects in the area around the vehicle 101. The surround view generating module 231 may map each image frame using the homography matrices to generate a component image in accordance with a target shape as shown in FIG. 2B, which provides a surround view of the vehicle 101. The homography matrices and the component images generated for the surround view may be stored as the surround view data 215.

Henceforth, the process of handling occluded regions in the image frame to generate the surround view is explained with the help of one or more examples for better understanding of the present disclosure. However, the one or more examples should not be considered as a limitation of the present disclosure.

Consider an exemplary scenario with three vehicle V1, V2 and V3, wherein each vehicle belongs to a different make and model and are passing through the same path P1 and same location L1 at different times T1, T2 and T3 respectively. Consider that plurality of image capturing devices i.e. cameras mounted on the vehicles V1 and V2 do not have any deposition of dust or water on their respective lenses. The below Table 1 shows the camera configuration of the vehicles V1, V2 and V3. Exemplary cameras are indicated as C1, C2 and C3 for vehicle V3 as shown in the FIG. 2C and C4 is not visible in the figure.

TABLE 1

| Vehicle | Number of cameras | Front (Yes/No and number of cameras) | Rear (Yes/No and number of cameras) | Left (Yes/No and number of cameras) | Right (Yes/No and number of cameras) |
| --- | --- | --- | --- | --- | --- |
| V1 | 4 | Yes - 1 | Yes - 1 | Yes - 1 | Yes - 1 |
| V2 | 6 | Yes - 1 | Yes - 1 | Yes - 2 | Yes - 2 |
| V3 | 4 | Yes - 1 | Yes - 1 | Yes - 1 | Yes - 1 |

Figure 2C:
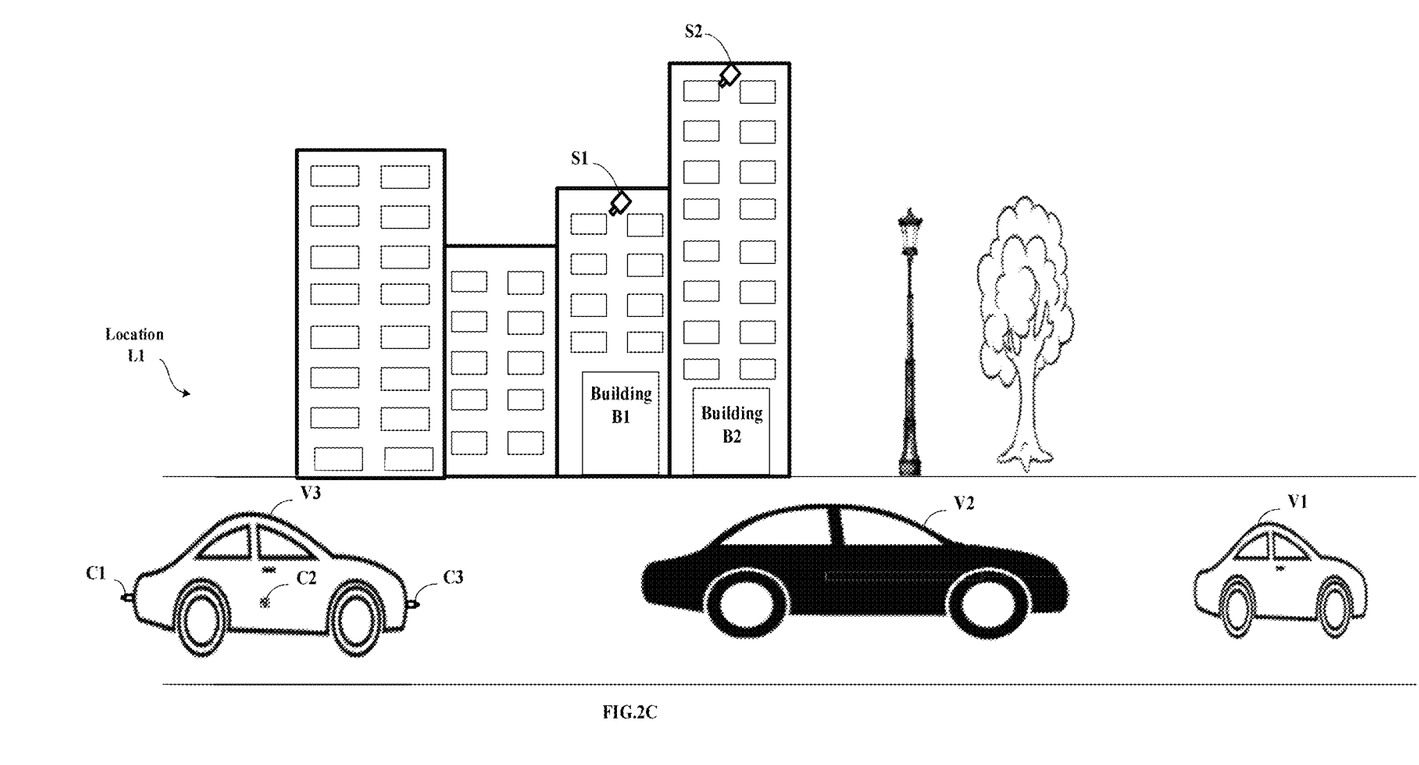
FIG. 2C shows an exemplary scenario in accordance with some embodiments of the present disclosure.

Therefore, each of the plurality of images received from the cameras mounted on vehicles V1 and V2 are occlusion free. Hence, as per some embodiments of the present disclosure, each of the plurality of images of the vehicle V1 and V2 may be transmitted to the shared repository for training the machine learning model. Further, plurality of images from stationary cameras S1 and S2 mounted on buildings B1 and B2 respectively as shown in the FIG. 2C are also transmitted to the shared repository.

Consider vehicle V3 has dust deposited on the camera mounted in the front. Therefore, the plurality of images captured by the camera mounted in the front of V3 may include one or more occluded blocks. The plurality of image frames having presence of occluded blocks may be mapped with the pre-stored image data to predict the one or more occluded blocks in each of the plurality of image frames. The machine learning model may select the pre-stored images based on the GPS location of V3, motorable surface on which V3 is moving and other surroundings of the vehicle V3 which may be learnt through the plurality of images, lidar data and the point cloud data received from the plurality of sensors associated with the vehicle V3. Accordingly, the machine learning model may select the pre-stored images of the vehicles V1 and V2, since these vehicles had passed through the same location L1 on the same path as the vehicle V3 at different times T1 and T2. Also, the pre-stored images of the stationary cameras S1 and S2 may also be used for mapping the plurality of image frames with the pre-stored images to detect the one or more occluded blocks. Though the vehicles V1, V2 and V3 are of different make and model, the surround view generating device 107 is capable of using the pre-stored image data of any vehicle for predicting the one or more occluded blocks.

Therefore, upon predicting the one or more occluded blocks, the processor 109 may stitch the predicted one or more occluded blocks to the plurality of image frames that were detected with presence of the one or more occluded blocks, to generate one or more corrected image frames. Finally, the one or more corrected image frames and the plurality of image frames may be subjected to homography mapping technique to generate a surround view of the vehicle V3.

Figure 3:
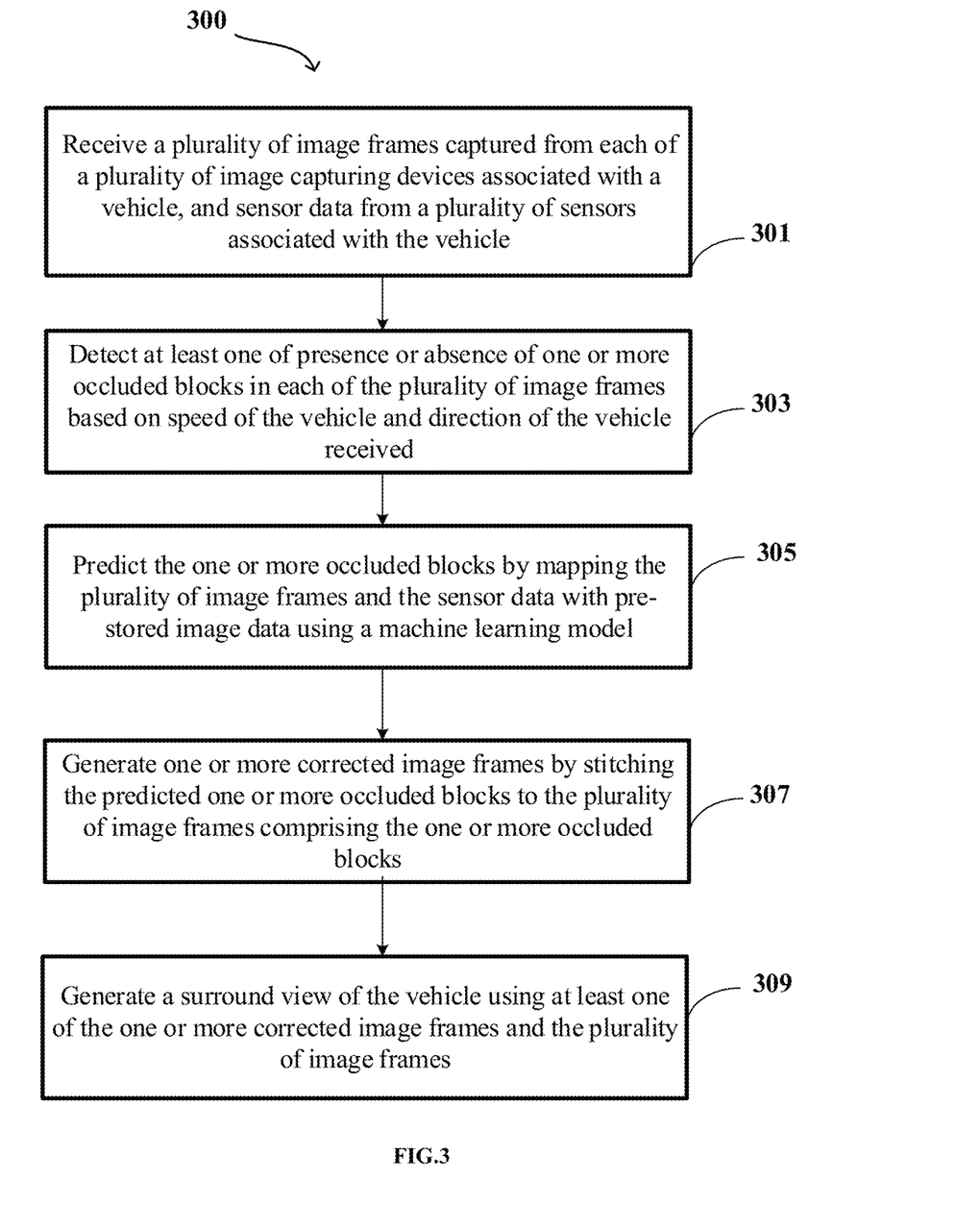
FIG. 3 shows a flowchart illustrating a method of handling occluded regions in an image frame to generate a surround view in accordance with some embodiments of the present disclosure.

FIG. 3 shows a flowchart illustrating a method of handling occluded regions in an image frame to generate a surround view in accordance with some embodiments of the present disclosure.

As illustrated in FIG. 3, the method 300 comprises one or more blocks illustrating a method of handling occluded regions in an image frame to generate a surround view. The method 300 may be described in the general context of computer-executable instructions. Generally, computer-executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include receiving, by a processor 109 of the surround view generating device 107, a plurality of image frames captured from each of a plurality of image capturing devices 103 associated with a vehicle 101, and sensor data 209 from a plurality of sensors associated with the vehicle 101. In some embodiments, the plurality of image capturing devices 103 may be mounted on the vehicle 101 in a way that Field of Views (FOVs) of each of the plurality of image capturing devices 103 is non-overlapping.

At block 303, the method 300 may include detecting, by the processor 109, at least one of presence or absence of one or more occluded blocks in each of the plurality of image frames based on speed of the vehicle 101 and direction of the vehicle 101 received as part of the sensor data 209. As an example, the sensor data 209 may include, but not limited to, point cloud data, proximity data, lidar data, location data, the speed of the vehicle, or the direction of the vehicle 101. In some embodiments, the processor 109 may divide each of the plurality of image frames into one or more blocks and may determine an average optical flow vector of each block in each of the plurality of image frames. Further, the processor 109 may compare the average optical flow vector of each block with a predefined optical flow threshold which is selected based on the speed of the vehicle 101 and the direction of the vehicle 101. The processor 109 may detect the presence of the one or more occluded blocks when the average optical flow vector of the one or more blocks is greater than or equal to the predefined optical flow threshold. On the other hand, when the average optical flow vector of the one or more blocks is lower than the predefined optical flow threshold, the processor 109 may detect the absence of the one or more occluded blocks.

At block 305, the method 300 may include predicting, by the processor 109, the one or more occluded blocks by mapping the plurality of image frames and the sensor data 209 with pre-stored image data using a machine learning model. As an example, the machine learning model may be a Location-specific Global Prediction Model (LGPM).

At block 307, the method 300 may include generating, by the processor 109, one or more corrected image frames by stitching the predicted one or more occluded blocks to the plurality of image frames comprising the one or more occluded blocks.

At block 309, the method 300 may include generating, by the processor 109, a surround view of the vehicle 101 using at least one of the one or more corrected image frames and the plurality of image frames. In some embodiments, the surround view may be a top-view or a bird's eye view of the vehicle 101 along with a coverage of 360-degree surrounding area of the vehicle 101 which assists driver of the vehicle 101 in manoeuvring the vehicle 101.

Figure 4:
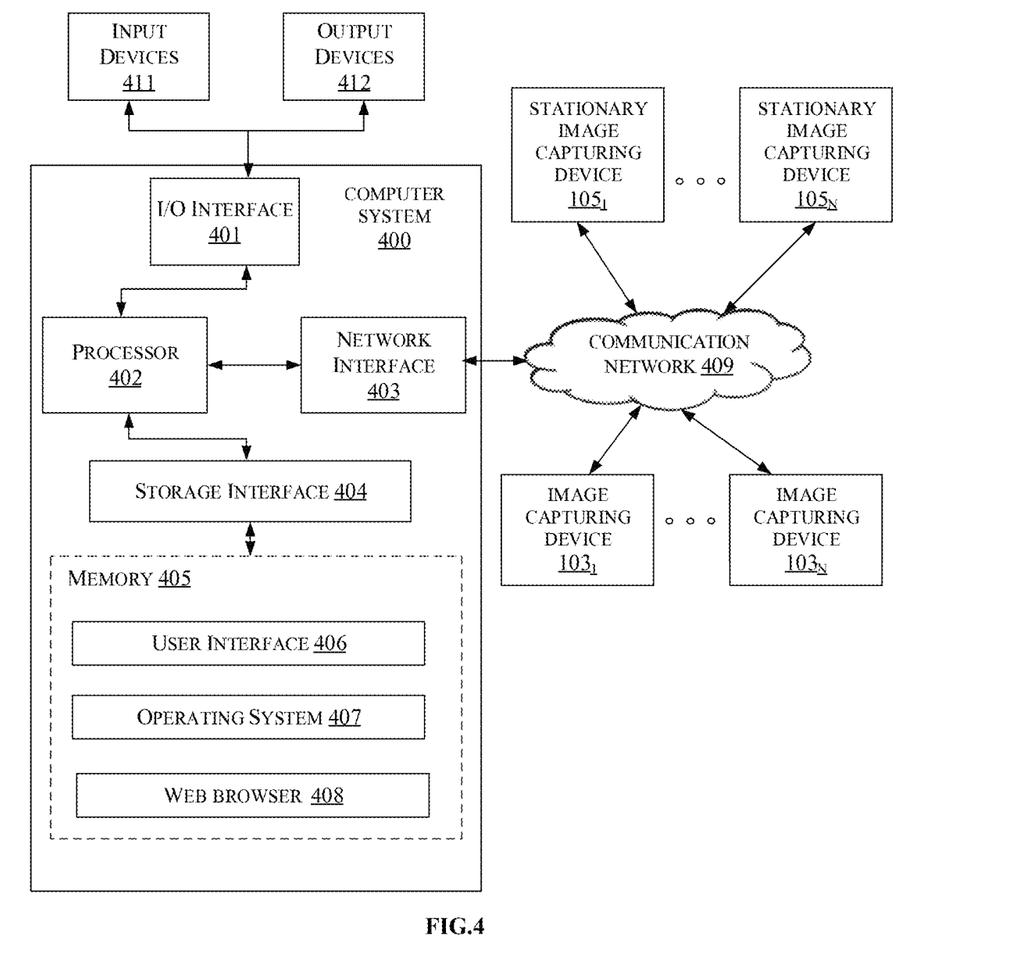
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present invention. In some embodiments, the computer system 400 can be surround view generating device 107 that is used for handling occluded regions in an image frame to generate a surround view. The computer system 400 may include a central processing unit ("CPU" or "processor") 402. The processor 402 may include at least one data processor for executing program components for executing user or system-generated business processes. A user may include a person, a person using a device such as those included in this invention, or such a device itself. The processor 402 may include specialized processing units such as integrated system (bus)

controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the computer system 400 may communicate with the input devices 411 and the output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with plurality of image capturing devices 103 ($103_1$ up to $103_n$), and one or more stationary image capturing devices 105 ($105_1$ up to $105_n$). The communication network 409 can be implemented as one of the different types of networks, such as intranet or Local Area Network (LAN), Closed Area Network (CAN) and such. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The plurality of image capturing devices 103 may include, but not limited to, cameras. Further, the one or more stationary image capturing devices 105 may include, but not limited to, security cameras situated in surrounding buildings and cameras situated near traffic signals. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, checkboxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for handling occluded regions in an image frame to generate a surround view. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A method of handling occluded regions in an image frame to generate a surround view, the method comprising:
    receiving, by a surround view generating device, a plurality of image frames captured from each of a plurality of image capturing devices associated with a vehicle, and sensor data from a plurality of sensors associated with the vehicle, wherein the plurality of image capturing devices comprise a non-overlapping field of view;
    detecting, by the surround view generating device, at least one of presence or absence of one or more occluded blocks in each of the plurality of image frames based on speed of the vehicle and direction of the vehicle received as part of the sensor data;
    predicting, by the surround view generating device, the one or more occluded blocks by mapping the plurality of image frames and the sensor data with pre-stored image data using a machine learning model;
    generating, by the surround view generating device, one or more corrected image frames by stitching the predicted one or more occluded blocks to the plurality of image frames comprising the one or more occluded blocks; and
    generating, by the surround view generating device, a surround view of the vehicle using at least one of the one or more corrected image frames and the plurality of image frames.

2. The method as claimed in claim 1 wherein the sensor data comprises at least one of point cloud data, proximity data, lidar data, location data, the speed of the vehicle, or the direction of the vehicle.

3. The method as claimed in claim 1, wherein detecting at least one of the presence or the absence of the one or more occluded blocks comprises:
    dividing, by the surround view generating device, each of the plurality of image frames into one or more blocks;
    determining, by the surround view generating device, an average optical flow vector of each block in each of the plurality of image frames;
    comparing, by the surround view generating device, the average optical flow vector of each block with a predefined optical flow threshold, wherein the predefined optical flow threshold is selected based on the speed of the vehicle and the direction of the vehicle; and
    detecting, by the surround view generating device, at least one of the presence of the one or more occluded blocks when the average optical flow vector of the one or more blocks is greater than or equal to the predefined optical flow threshold, and
    the absence of the one or more occluded blocks when the average optical flow vector of the one or more blocks is lower than the predefined optical flow threshold.

4. The method as claimed in claim 1, wherein the pre-stored image data comprises at least one of images captured by one or more other vehicles that had navigated along same path as the vehicle or images captured by one or more stationary image capturing devices associated with civic infrastructure.

5. The method as claimed in claim 1, wherein the surround view is generated using a homography mapping technique.

6. A surround view generating device for handling occluded regions in an image frame to generate a surround view, the surround view generating device comprising:
    a processor; and
    a memory communicatively coupled to the processor, wherein the memory stores the processor-executable instructions, which, on execution, causes the processor to:
        receive a plurality of image frames captured from each of a plurality of image capturing devices associated with a vehicle, and sensor data from a plurality of sensors associated with the vehicle, wherein the plurality of image capturing devices comprise a non-overlapping field of view;

detect at least one of presence or absence of one or more occluded blocks in each of the plurality of image frames based on speed of the vehicle and direction of the vehicle received as part of the sensor data;

predict the one or more occluded blocks by mapping the plurality of image frames and the sensor data with pre-stored image data using a machine learning model;

generate one or more corrected image frames by stitching the predicted one or more occluded blocks to the plurality of image frames comprising the one or more occluded blocks; and generate a surround view of the vehicle using at least one of the one or more corrected image frames and the plurality of image frames.

7. The surround view generating device as claimed in claim 6, wherein the sensor data comprises at least one of point cloud data, proximity data, lidar data, location data, the speed of the vehicle, or the direction of the vehicle.

8. The surround view generating device as claimed in claim 6, wherein the processor is configured to detect at least one of the presence or the absence of the one or more occluded blocks by:

dividing each of the plurality of image frames into one or more blocks;

determining an average optical flow vector of each block in each of the plurality of Image frames;

comparing the average optical flow vector of each block with a predefined optical flow threshold, wherein the predefined optical flow threshold is selected based on the speed of the vehicle and the direction of the vehicle; and detecting at least one of the presence of the one or more occluded blocks when the average optical flow vector of the one or more blocks is greater than or equal to the predefined optical flow threshold, and the absence of the one or more occluded blocks when the average optical flow vector of the one or more blocks is lower than the predefined optical flow threshold.

9. The surround view generating device as claimed in claim 6, wherein the pre-stored image data comprises at least one of images captured by one or more other vehicles that had navigated along same path as the vehicle or images captured by one or more stationary image capturing devices associated with civic infrastructure.

10. The surround view generating device as claimed in claim 6, wherein the processor is configured to generate the surround view using a homography mapping technique.

11. A non-transitory computer readable medium including instructions stored thereon that when processed by a surround view generating device, causes the surround view generating device to perform operations comprising:

receiving a plurality of image frames captured from each of a plurality of image capturing devices associated with a vehicle, and sensor data from a plurality of sensors associated with the vehicle, wherein the plurality of image capturing devices comprise a non-overlapping field of view;

detecting at least one of presence or absence of one or more occluded blocks in each of the plurality of image frames based on speed of the vehicle and direction of the vehicle received as part of the sensor data;

predicting the one or more occluded blocks by mapping the plurality of image frames and the sensor data with pre-stored image data using a machine learning model;

generating one or more corrected image frames by stitching the predicted one or more occluded blocks to the plurality of image frames comprising the one or more occluded blocks; and generating a surround view of the vehicle using at least one of the one or more corrected image frames and the plurality of image frames.

12. The medium as claimed in claim 11, wherein the sensor data comprises at least one of point cloud data, proximity data, lidar data, location data, the speed of the vehicle, or the direction of the vehicle.

13. The medium as claimed in claim 11, wherein detecting at least one of the presence or the absence of the one or more occluded blocks comprises:

dividing, by the surround view generating device, each of the plurality of image frames into one or more blocks;

determining, by the surround view generating device, an average optical flow vector of each block in each of the plurality of image frames;

comparing, by the surround view generating device, the average optical flow vector of each block with a predefined optical flow threshold, wherein the predefined optical flow threshold is selected based on the speed of the vehicle and the direction of the vehicle; and detecting, by the surround view generating device, at least one of the presence of the one or more occluded blocks when the average optical flow vector of the one or more blocks is greater than or equal to the predefined optical flow threshold, and the absence of the one or more occluded blocks when the average optical flow vector of the one or more blocks is lower than the predefined optical flow threshold.

14. The medium as claimed in claim 11, wherein the pre-stored image data comprises at least one of images captured by one or more other vehicles that had navigated along same path as the vehicle or images captured by one or more stationary image capturing devices associated with civic infrastructure.

15. The medium as claimed in claim 11, wherein the surround view is generated using a homography mapping technique.

* * * * *